(12) United States Patent
Shin et al.

(10) Patent No.: US 7,104,679 B2
(45) Date of Patent: Sep. 12, 2006

(54) BACKLIGHT UNIT

(75) Inventors: Hyun Ho Shin, Kyounggi-do (KR); Je Hong Kim, Kyounggi-do (KR); Seong Man Jeon, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 155 days.

(21) Appl. No.: 10/325,973

(22) Filed: Dec. 23, 2002

(65) Prior Publication Data

US 2003/0117793 A1 Jun. 26, 2003

(30) Foreign Application Priority Data

Dec. 24, 2001 (KR) .................. 10-2001-0084074

(51) Int. Cl.
*F21V 8/00* (2006.01)
*F21V 5/02* (2006.01)

(52) U.S. Cl. .................. 362/626; 362/612; 362/339; 362/330

(58) Field of Classification Search .............. 362/31, 362/560, 327, 328, 330, 339, 26, 331, 623, 362/626, 615, 628; 385/146; 349/65
See application file for complete search history.

(56) References Cited

U.S. PATENT DOCUMENTS

| | | | |
|---|---|---|---|
| 6,074,069 A * | 6/2000 | Chao-Ching et al. ......... 362/26 |
| 6,123,431 A * | 9/2000 | Teragaki et al. .............. 362/31 |
| 6,612,709 B1 * | 9/2003 | Yamada et al. ............... 362/31 |
| 6,648,485 B1 * | 11/2003 | Colgan et al. ................ 362/31 |
| 6,799,859 B1 * | 10/2004 | Ida et al. ...................... 362/26 |
| 2001/0049893 A1 * | 12/2001 | Maas et al. ................... 40/544 |
| 2002/0080598 A1 * | 6/2002 | Parker et al. ................. 362/31 |
| 2003/0128538 A1 * | 7/2003 | Shinohara et al. ............ 362/31 |

* cited by examiner

*Primary Examiner*—Sandra O'Shea
*Assistant Examiner*—Peggy A. Neils
(74) *Attorney, Agent, or Firm*—Birch, Stewart, Kolasch & Birch, LLP

(57) ABSTRACT

There is provided a backlight unit that is capable of making it possible to highly condense light while simultaneously reducing costs. A backlight unit according to an embodiment of the present invention includes a light source for generating light; a lamp housing installed to cover the light source and for reflecting the light; and a light guide panel whereon there are formed a plurality of engraved patterns with a specific gap and a specific depth at the lower surface thereof, and wherein the vertical angle of the engraved pattern, which faces an out-coming surface of the light guide panel, is in a range of 30~95°. Accordingly, it can be applicable to display panels of various sizes and a picture is improved at the same time. Also, in the backlight unit, it is possible to get rid of at least one of a prism sheet, a diffusion sheet and a reflecting sheet, thereby reducing costs. Moreover, this backlight unit can obtain a highly condensed light by using a light emitting diode that controls the curvature to condense the out-coming light within a specific angle.

24 Claims, 8 Drawing Sheets

BACKLIGHT UNIT

This nonprovisional application claims priority under 35 U.S.C. § 119(a) on patent application No. P2001-84074, filed in Korea on Dec. 24, 2001, which is herein incorporated by reference

BACKGROUND OF THE INVENTION

1. Field of the Invention

The present invention relates to a backlight unit, and more particularly to a backlight unit that is capable of making it possible to highly condense light and reduces costs at the same time.

2. Description of the Background Art

Generally, a liquid crystal display LCD controls the transmittance of a light beam supplied from a backlight unit to display a desired picture on a screen by a liquid crystal display panel consisting of a plurality of liquid crystal cells arranged in matrix type form, and a plurality of control switches for switching the video signals to be supplied to each liquid crystal cell.

In conjunction with FIG. 1, there is explained a backlight unit as follows.

Figure 1:
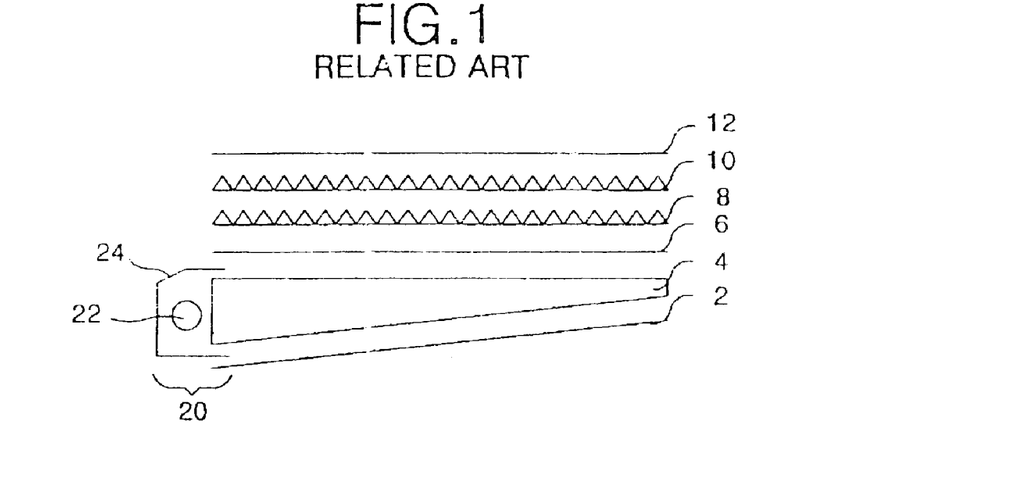
FIG. 1 is a view representing a conventional backlight unit.

Referring to FIG. 1, a conventional backlight unit includes a light guide panel 4 for guiding a light beam via a light incident part 20; a reflecting plate 2 located under the light guide panel 4 for reflecting a light beam, which progresses to a lower surface and side surfaces of the light guide panel 4, to the upper surface; the first diffusion sheet 6 for diffusing the light beam passed through the light guide panel 4; the first and second prism sheet 8 and 10 for controlling the progress direction of the light beam passed through the first diffusion sheet 6; and the second diffusion sheet 12 for diffusing the light via the prism sheets 8 and 10 and protecting the prism sheets. The light incident part 20 consists of a lamp 22 for generating a light beam and a lamp housing 24 having the lamp 22 mounted on and reflecting the light beam to the light guide panel 4.

A cold cathode fluorescent lamp is mainly used as the lamp 22, and the light generated from the lamp 22 is incident on the light guide panel 4 through the incident surface located at the side surface of the light guide panel 4. The lamp housing 24 has a reflecting surface inside to reflect the light from the lamp 22 to the incident surface of the light guide panel 4. The light guide panel 4 makes it possible to deliver the light incident from the lamp 22 to where it is far away from the lamp 22. The reflecting plate 2 is installed at the lower surface of the light guide panel 4 to face it.

The reflecting plate 2 reflects again the light incident on itself through the rear surface of the light guide panel 4 to the light guide panel 4, thereby reducing light loss. A printed pattern formed at the lower surface of the light guide panel 4 is provide so that the light beam passed through the light incident part is reflected in a specific angle at the rear surface, being an inclined surface, to uniformly progress to an out-coming surface. At this moment, the light progressing to the lower surface and the side surface of the light guide panel 4 is reflected at the reflecting plate 2 to progress to the out-coming surface. The light come out via the light guide panel 4 diffuses light to the whole area.

On the other hand, the light incident on a liquid crystal display panel (not shown) has the highest light efficiency when perpendicular to the liquid crystal display panel. Therefore, it is desirable to deposit two forward directional prism sheets in order to make the progress angle of the light, which has come out of the light guide panel 4, perpendicular to the liquid crystal display panel. The light passed through the first and the second prism sheet 8 and 10 is incident on the liquid crystal display panel via the second diffusion sheet 12. The conventional backlight unit with such a composition can has a desired viewing angle profile only when it has two prism sheets. In this case, there are problems in that light loss is increased and manufacturing costs are increased as well.

Figure 2:
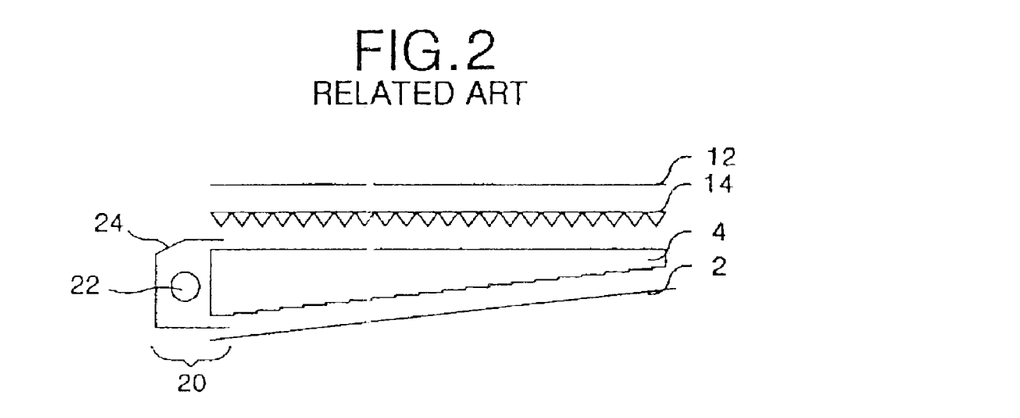
FIG. 2 is a view representing a backlight unit in use of a light guide panel with a conventional relief pattern.

There is illustrated in FIG. 2, a structure proposed to solve the problem. In conjunction with FIG. 2, it is explained as follows.

Referring to FIG. 2, a conventional backlight unit includes a light guide panel 4 for guiding a light beam via the light incident part 20, a reflecting plate 2 located at the lower part of the light guide panel 4 for reflecting a light beam progressing toward the lower and side surface of the light guide panel 4 to an upper surface thereof, a reverse directional prism sheet 14 controlling the progress direction of the light beam passed through the light guide panel 4, and a diffusion sheet 12 for diffusing a light beam passed through the reverse directional prism sheet 14.

The function and operation of the light incident part 20 and the reflecting plate 2 is explained sufficiently enough in FIG. 1 so that the detailed description will be omitted here.

A relief prism pattern provided at the lower surface of the light guide panel 4 is insufficient to satisfy a total reflection condition of the light beam passed through the light incident part 20 so that the light beam is made to progress to the upper surface uniformly. A reverse directional prism sheet 14 is arranged at the upper surface of the light guide panel 4. In this case, because the angle of the light beam coming out of the light guide panel 4 is over approximately 65°, it is desirable to keep the vertical angle of the prism sheet 14 between 63° and 70°.

Accordingly, the light beam passed through the prism sheet 14 becomes perpendicular to the liquid crystal display panel. The light beam passed through the prism sheet 14 is diffused and is progressed to the entire area by the diffusion sheet 12. The conventional backlight unit with such a composition has a problem in that the wall surface of the light guide panel 4 is mirrored or the bright line of the light incident part 20 is visible due to the use of the reverse directional prism sheet 14.

Therefore, there is an urgent need for a backlight unit that is capable of highly condensing light and minimizing the wall surface of the light guide panel 4 being mirrored and visibility of the bright line of the light incident part 20.

Figure 3:
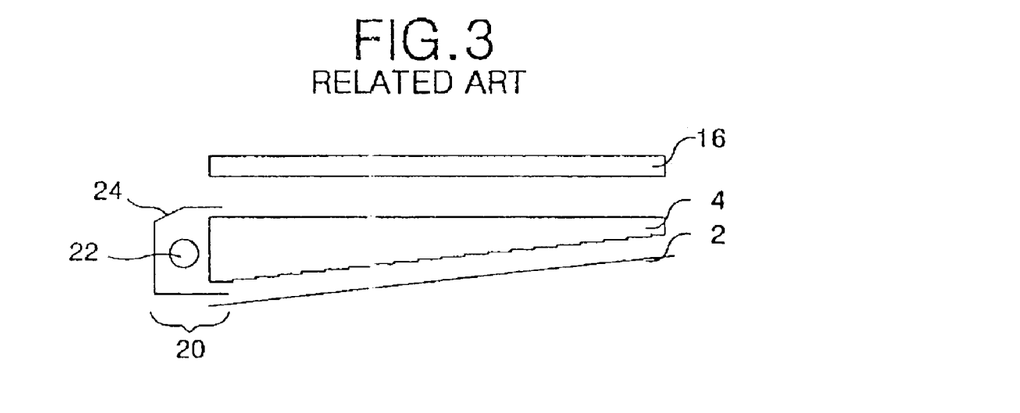
FIG. 3 is a view representing a backlight unit in use of a conventional condensing sheet.
Figure 4:
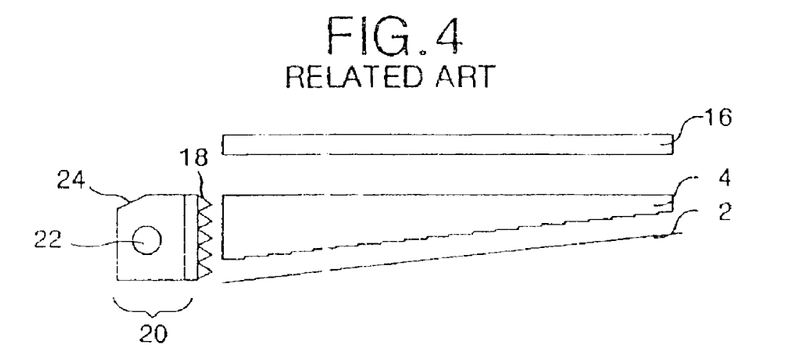
FIG. 4 is a view representing a backlight unit in use of a conventional prism foil.

Such a backlight unit condenses light by use of a condensing sheet 16 with good condensing efficiency as shown in FIGS. 3 and 4.

The backlight unit for highly condensing light, shown in FIG. 3, has a relief pattern provided at the lower surface of the light guide panel 4 to provide a function of the prism sheets 10 and 8 and the diffusion sheets 6 and 12, as shown in FIG. 1. The light beam via the light guide panel 4 is passed through the condensing sheet 16 to improve its light condensing efficiency.

The backlight unit for highly condensing light, shown in FIG. 4, has a relief pattern formed at the lower surface of the light guide panel 4 and a prism foil 18 formed at the light out-coming area of the light incident part 20 for condensing the light that comes out of the lamp 22.

However, because the condensing sheet 16 shown in FIGS. 3 and 4 is so expensive that it is only used for aeronautical or military purposes. It can hardly be used for general purposes. Also, there is a problem in that the backlight unit for highly condensing light, shown in FIG. 4, has a size as large as the area where the prism foil 18 is formed.

SUMMARY OF THE INVENTION

Accordingly, it is an object of the present invention to provide a backlight unit that is capable of making it possible to highly condense light while reducing costs.

In order to achieve these and other objects of the invention, a backlight unit according to an aspect of the present invention includes a light source for generating light; a lamp housing installed to cover the light source and for reflecting the light; and a light guide panel whereon there are formed a plurality of engraved patterns with a specific gap and a specific depth at the lower surface thereof, and wherein the vertical angle of the engraved pattern, which faces an out-coming surface of the light guide panel, is in a range of 30~95°.

The backlight unit further includes a diffusion sheet for diffusing a light beam passed through the light guide panel; and a prism sheet for controlling the progress direction of the light beam passed through the diffusion sheet.

Herein, the specific gap is formed relatively wider if the engraved pattern is closer to the light source, and relatively narrower if the engraved pattern is more distant from the light source.

Herein, the specific depth is formed by etching a lower surface of the light guide panel from a few μm up to dozens of μm in accordance with the size of a display panel.

Herein, the engraved pattern is formed with a distance of a few mm from an incident surface of the light guide panel.

Herein, a pitch of the engraved pattern is formed smaller if the pitch is located at a side surface area facing an incident surface of the light guide panel, and larger if the pitch is located at the other area.

Herein, the engraved pattern is formed in the shape of a polygon, the pitch has a first and second tilt angle formed, the first tilt angle is in a range of about 25~60°, and the second tilt angle is in a range of about 60~90°.

Herein, the first tilt angle is in a range of about 46~50°, and the second tilt angle is in a range of about 78~82°.

Herein, at least one condenser or prism pattern is formed between the light source and an incident surface of the light guide panel for condensing light.

Herein, the condenser is formed of Polymethyl Methacrylate PMMA.

Herein, the condenser has a first and second tilt angle formed on a lower surface of the condenser, the first and second tilt angle being in a range of about 10~45°.

Herein, the first and second tilt angle are in a range of about 35~37°.

The backlight unit further includes a reflecting plate formed facing the light guide panel at a lower part of the light guide panel.

The backlight unit further includes a reflecting part coated with reflecting metal to be formed on the engraved pattern at a lower surface of the light guide panel.

Herein, the reflecting metal is formed of aluminum Al or silver Ag etc.

Herein, the backlight unit is utilized in a display panel of 6 inches or less.

A backlight unit according to another aspect of the present invention includes a light emitting diode for generating the light condensed within a specific angle; and a light guide panel whereon there are formed a plurality of engraved patterns with a specific gap and a specific depth at the lower surface thereof, and wherein the vertical angle of the engraved pattern, which faces an out-coming surface of the light guide panel, is in a range of about 30~95°.

Herein, the specific gap is formed wider relatively wider if the engraved pattern is closer to the light emitting diode, and relatively narrower if the engraved pattern is more distant from the light emitting diode.

Herein, the specific depth is formed by etching a lower surface of the light guide panel from a few μm up to dozens of μm in accordance with the size of a display panel.

Herein, the engraved pattern is formed with a distance of a few mm from an incident surface of the light guide panel.

Herein, a pitch of the engraved pattern is formed smaller if the pitch is located at a side surface area facing an incident surface of the light guide panel, and larger if the pitch is located at the other area.

Herein, the engraved pattern is formed in the shape of a triangle, the pitch has a first and second tilt angle formed, the first tilt angle is in a range of about 25~60°, and the second tilt angle is in a range of about 60~90°.

Herein, at least one condenser or prism pattern is formed between the light emitting diode and an incident surface of the light guide panel for condensing light.

The backlight unit further includes a reflecting plate formed facing the light guide panel at a lower part of the light guide panel.

The backlight unit further includes a reflecting part coated with reflecting metal to be formed on the engraved pattern at a lower surface of the light guide panel.

Herein, the reflecting metal is formed of aluminum Al or silver Ag etc.

Herein, the backlight unit is utilized in a display panel of 6 inches or less.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF PREFERRED EMBODIMENTS

With reference to FIGS. 5 to 19, preferred embodiments of the present invention are explained as follows.

Figure 5:
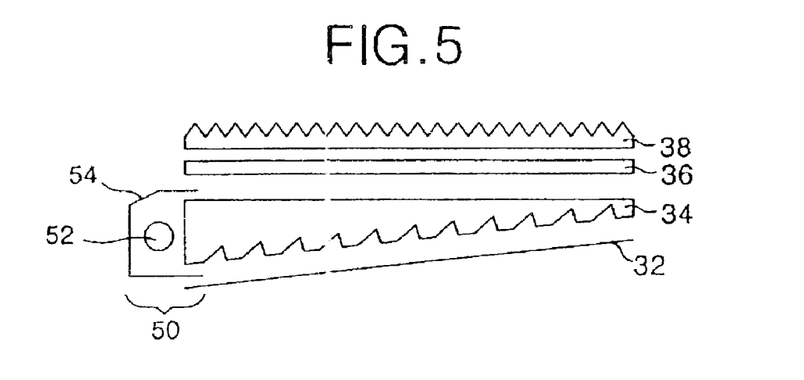
FIG. 5 is a view representing a backlight unit according to the first embodiment of the present invention.

Referring to FIG. 5, a backlight unit according to a first embodiment of the present invention includes a light guide panel 34 for guiding a light beam via a light incident part 50; a reflecting plate 32 located under the light guide panel 34 for reflecting a light beam, which progresses to a lower surface and side surfaces of the light guide panel 34, to the upper surface; a diffusion sheet 36 for diffusing the light beam passed through the light guide panel 34; and a prism sheet 38 for controlling the progress direction of the light beam passed through the diffusion sheet 36.

The light incident part 50 consists of a lamp 52 for generating a light beam and a lamp housing 54 having the lamp 52 mounted thereon and reflecting the light beam to the light guide panel 34.

A cold cathode fluorescent lamp is mainly used as the lamp 52, and the light generated from the lamp 52 is incident on the light guide panel 34 through the incident surface located at the side surface of the light guide panel 34. The lamp housing 54 has a reflecting surface inside to reflect the light from the lamp 52 to the incident surface of the light guide panel 34.

The reflecting plate 32 is installed at the rear surface of the light guide panel 34 so as to face it. The reflecting plate 32 reflects the light incident on itself through the rear surface of the light guide panel 34 to the light guide panel 34, thereby reducing light loss.

The light guide panel 34 makes it possible to deliver the light incident from the lamp 52 a distance away from the lamp 52.

Figure 6:
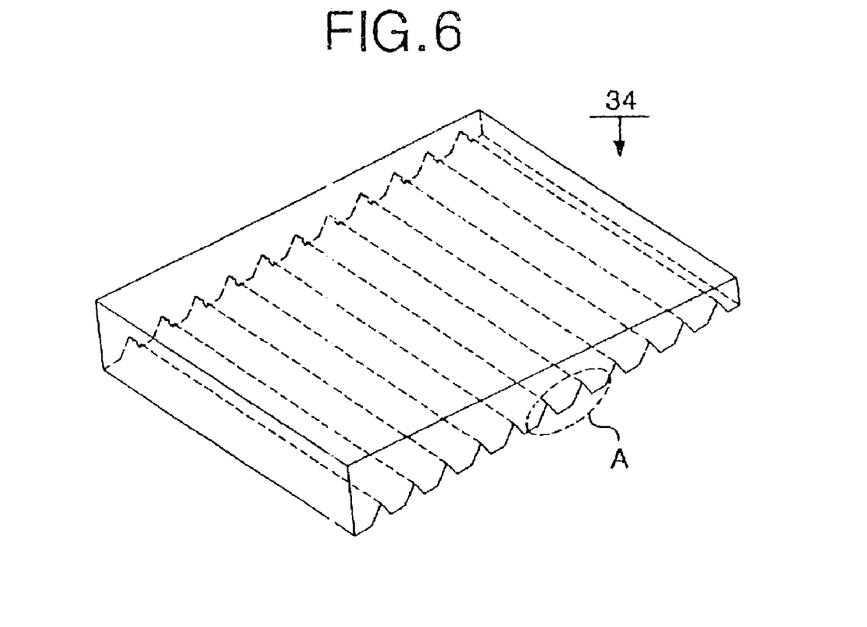
FIG. 6 is a perspective view representing a light guide panel illustrated in FIG. 5.

A plurality of engraved patterns A, as shown in FIG. 6, are formed at the lower surface of the light guide panel 34, which is formed being inclined in a specific angle. The engraved patterns A cause the progress direction of the light beam via the light incident part 50 to progress perpendicularly. The picture is improved by controlling the depth and gap etc. of the engraved pattern A.

Figure 7:
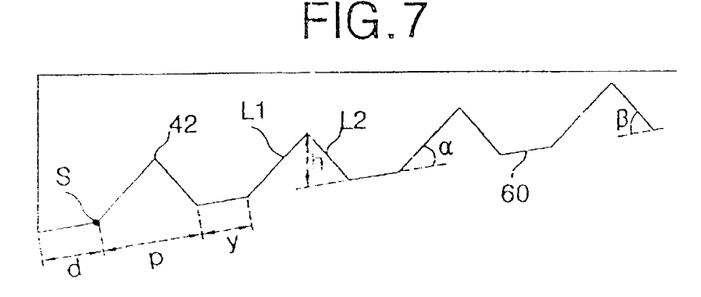
FIG. 7 is a diagram representing an engraved pattern shown in FIG. 6.

To describe this more particularly, the engraved patterns A, shown in FIG. 7, are formed in the shape of a triangle, that is, the lower surface 60 of the light guide panel 34 is etched to a specific depth 'h', thus forming the first inclined plane L1 and the second inclined plane L2. At this moment, the depth 'h' is controlled within the range of a few μm and dozens of μm in accordance with the size of the liquid crystal display panel to make it possible to improve the display quality. Also, the angle α between the lower surface 60 of the light guide panel 34 and the first inclined plane L1 is set to be in a range of 25~60°, the angle β between the lower surface 60 of the light guide panel 34 and the second inclined plane L2 is set to be 60~90° so that the vertical angle of a vertex 42 facing the out-coming surface of the light guide panel 34 is set to be in a range of 30~95°. It is desirable to have the angle α between the lower surface 60 of the light guide panel 34 and the first inclined plane L1 is set to be in a range of 46~50°, the angle β between the lower surface 60 of the light guide panel 34 and the second inclined plane L2 is set to be in a range of 78~82°.

In order to secure the uniformity of the light beam, the gap y between the engraved patterns is controlled. Actually, it is desirable that if it is closer to the light incident part, the gap y between the engraved patterns is set to be wide, and if it become more distant from the light incident part 50, the gap y between the engraved patterns is set to be narrow.

The engraved pattern A formed in the light guide panel 34 has a starting point S formed with a specific gap d therebetween from the incident surface of the light guide panel 34. If the starting point S is closer to the incident surface, the height h of the engraved pattern A is reduced, and if the starting point S is more distant from the incident surface, the height h of the engraved pattern A is increased. Because obscure rays generated at the light incident part 50 area are removed if the starting point S is closer to the incident surface, the engraved pattern should start within a few mm from the incident surface of the light guide panel 34.

The pitch between the engraved patterns A differs in accordance with the position where the engraved pattern A is formed. The pitch P of the engraved pattern A positioned at the area adjacent to the incident surface of the light guide panel 34 and in the mid-area is formed to be relatively large, and the pitch P of the engraved pattern positioned at the other area is formed to be relatively small.

Figure 8:
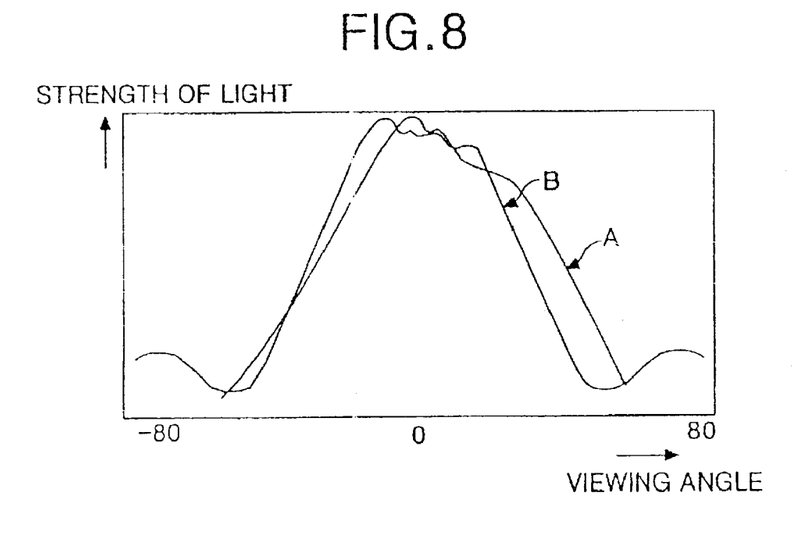
FIG. 8 is a graph representing light direction distribution of the backlight unit shown in FIG. 5.

FIG. 8 is a graph representing the direction distribution of the light coming out of the light guide panel 34. The horizontal axis, in FIG. 8, represents a viewing angle, the vertical axis represents the strength of light. The up and down viewing angle A and the left and right viewing angle B of the light beam coming out of the light guide panel 34, as shown in FIG. 8, causes the light to be condensed in a vertical and horizontal direction when compared with related art. In a case when the light guide panel 34 with such a structure is used, the usage of the prism sheet can be reduced from two sheets to one sheet, thereby reducing its cost. Also, the light loss caused by the prism sheet 38 is prevented, thus improving light efficiency.

Figure 9:
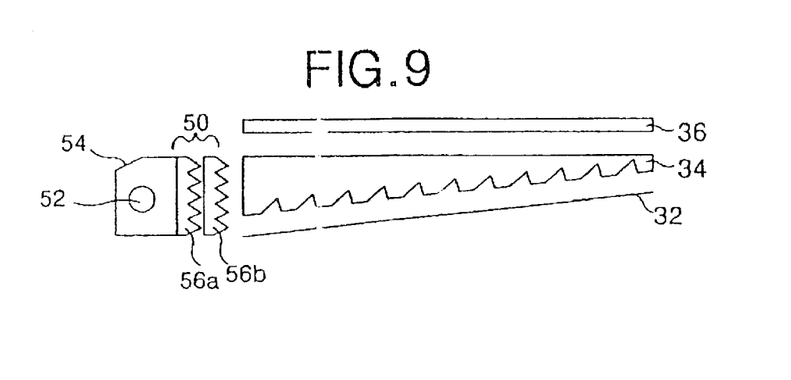
FIG. 9 is a view representing a backlight unit according to the second embodiment of the present invention.
Figure 10:
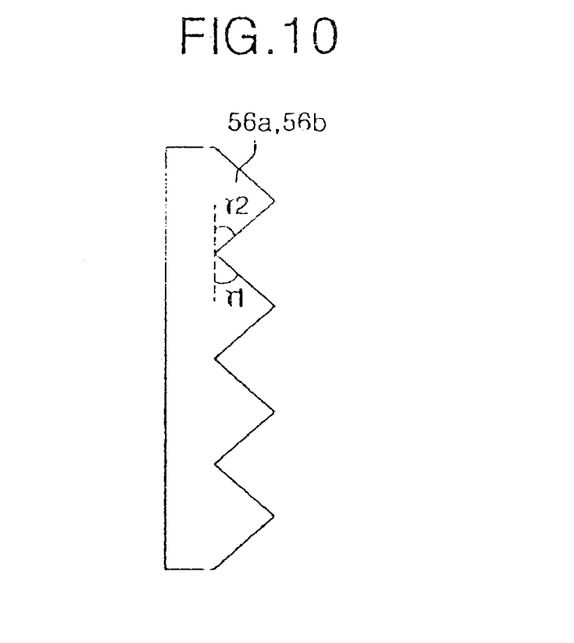
FIG. 10 is a diagram representing a condenser as shown in FIG. 9.

FIG. 9 is a view representing a backlight unit according to a second embodiment of the present invention, and FIG. 10 is a diagram more particularly representing the condenser illustrated in FIG. 9.

Referring to FIGS. 9 and 10, the backlight unit according to the second embodiment of the present invention includes the same components except that condensers 56a and 56b are formed at the light incident part 50 instead of the prism sheet 38 as compared with the backlight unit shown in FIG. 5.

The light incident part 50 includes a lamp 52 for generating light, a lamp housing 54 installed to cover the lamp 52, and the first and second condenser 56a and 56b for condensing light.

A cold cathode fluorescent lamp is mainly used as the lamp 52, and the light generated at the lamp 52 is incident on the first condenser 56a. The lamp housing 54 has a reflecting surface inside to reflect the light from the lamp 52 to the first condenser 56a.

The first and the second condenser 56a and 56b are formed of a plurality of prism patterns for condensing the light. Also, the first and second condenser 56a and 56b are formed between the lamp 52 and the light guide panel 34 to reduce the light loss occurring through the opening between the lamp 52 and the light guide panel 34. That is, the first and second condenser 56a and 56b condenses the light generated at the lamp 52 and the light reflected by the lamp housing 54. In this way, the light condensed by the first and second condenser 56a and 56b are incident to the light guide panel 34.

The first and second in-between angle ɤ1 and ɤ2 of the first and second condenser 56a and 56b are formed to be in a range of 10~45°, as shown in FIG. 10. To be desirable, when the first and second in-between angle ɤ1 and ɤ2 are in a range of 35~37°, the light is condensed at its maximum. The first and second condenser 56a and 56b is formed of acrylic resin etc., which has high strength so as not to be easily deformed or broken, and to have good transmittance. For example, the first and the second 56a and 56b are formed of Polymethyl Methacrylate PMMA.

Figure 11:
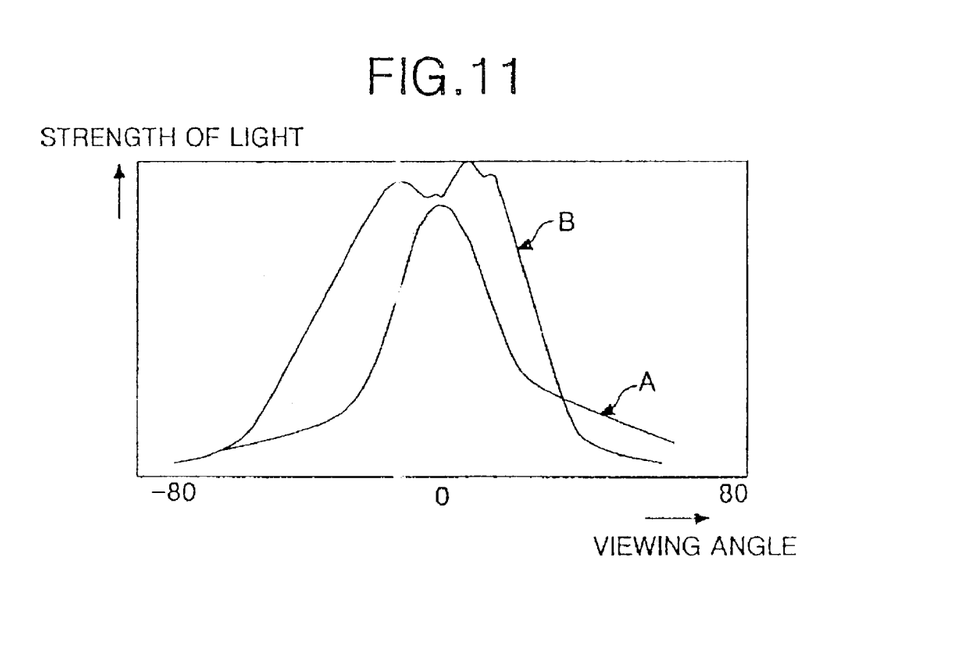
FIG. 11 is a graph representing light direction distribution of the backlight unit shown in FIG. 9.

FIG. 11 is a graph representing the direction distribution of the light coming out of the light guide panel 34 according to the second embodiment of the present invention. The horizontal axis of FIG. 11 represents a viewing angle and the vertical axis represents the strength of light respectively.

The up and down viewing angle A and the left and right viewing angle B of the light beam coming out of the light guide panel 34 are condensed in a vertical and horizontal direction respectively as compared with the related art. Accordingly, the existing light characteristic can be realized with the first and second condenser 56a and 56b and the light guide panel 34 without forming the conventional prism sheet of two sheets. Because it is not necessary to form the first and the second prism sheets as in the related art, costs can be reduced.

Figure 12:
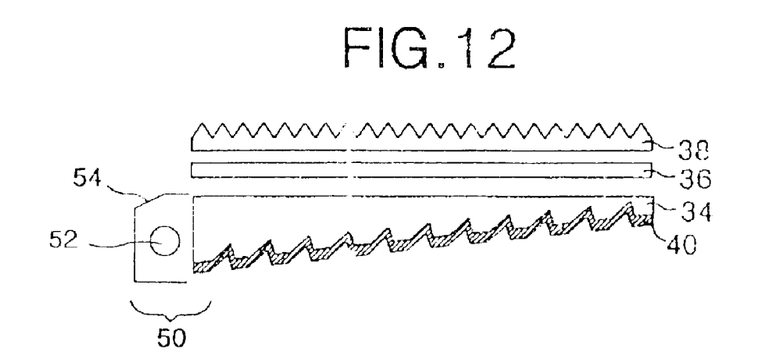
FIG. 12 is a view representing a backlight unit according to a third embodiment of the present invention.

FIG. 12 is a view representing a backlight unit according to a third embodiment of the present invention.

Referring to FIG. 12, the backlight unit according to a third embodiment of the present invention includes the same components except that a reflecting part 40 is formed by coating metal on the lower part of the light guide panel 34 instead of the reflecting sheet as compared with the backlight unit shown in FIG. 5.

The reflecting part 40 has reflecting material coated on the lower surface of the light guide panel 34 where a plurality of engraved patterns are formed. The reflecting part 40 is formed of reflecting material such as silver Ag, aluminum Al etc. The backlight unit with such a reflecting part 40 can be applied to a liquid crystal display with its size below 6 inches.

The reflecting part 40 reflects the light incident on itself through the lower surface of the light guide panel 34 to the light guide panel 34, thereby reducing light loss.

In the upper part of the light guide panel 34 is formed a diffusion sheet 36 for diffusing light passed through the light guide panel 34 and a prism sheet 38 for controlling the progress direction of the light beam passed through the diffusion sheet 36.

Figure 13:
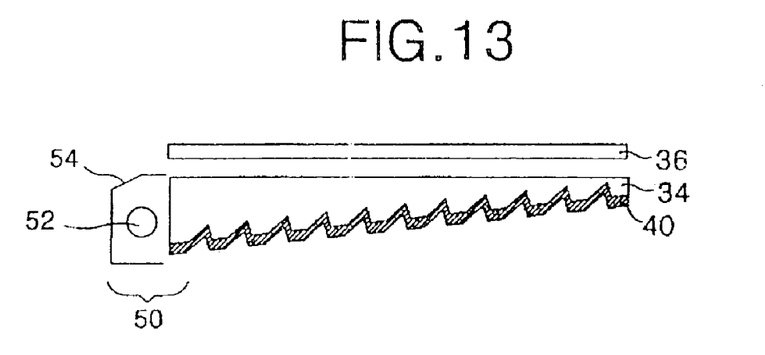
FIG. 13 is a view representing a backlight unit having a prism sheet, as shown in FIG. 12, removed.
Figure 14A:
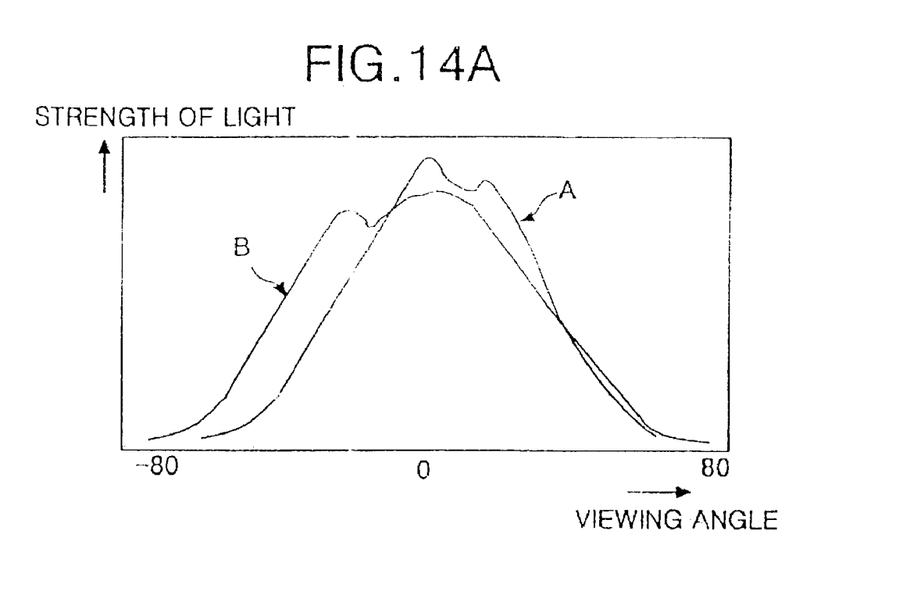
FIGS. 14a and 14b are graphs representing light direction distribution of the backlight unit shown in FIGS. 12 and 13.
Figure 14B:
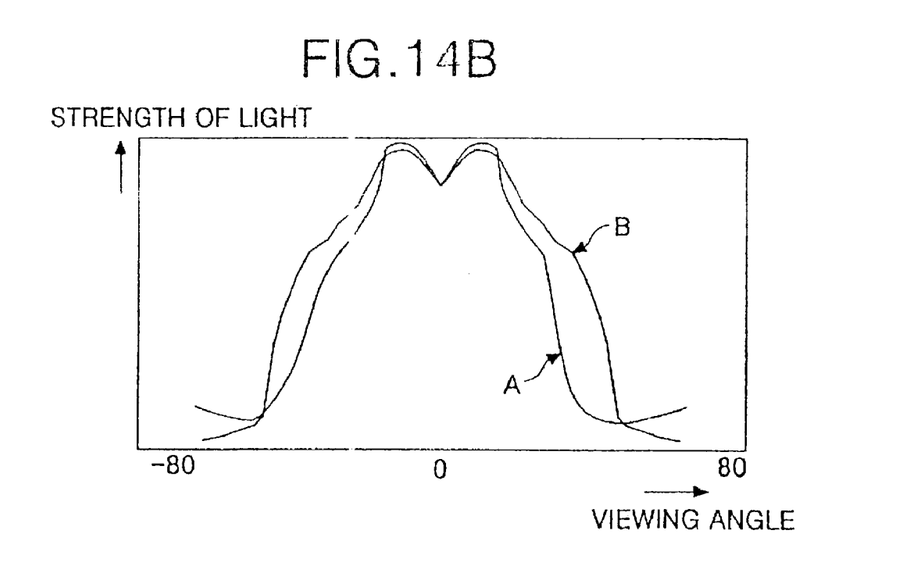

Even if the prism sheet 38 formed on the upper part of the light guide panel 34, as shown in FIG. 13, is removed, the backlight unit has the same effect. With reference to FIGS. 14a and 14b, these will be explained more particularly.

FIG. 14a and FIG. 14b show graphs representing the direction distribution of the light coming out of the backlight unit shown in FIGS. 12 and 13 respectively. The horizontal axis of FIGS. 14a and 14b represents a viewing angle, and the vertical axis represents the strength of light respectively.

The up and down viewing angle A and the left and right viewing angle B of the light beam coming out of the backlight unit, shown in FIG. 14a, are condensed in vertical and horizontal directions respectively as compared with the related art. The distribution of the light beam coming out of the backlight unit shown in FIG. 14b is almost similar to that of the backlight unit shown in FIG. 14a. Accordingly, the existing light characteristic can be realized, while forming a prism sheet of one sheet that was formed of two sheets conventionally, without forming the reflecting plate. Because it is not necessary to form the prism sheet and the reflecting sheet as in the related art, costs can be reduced.

Figure 15:
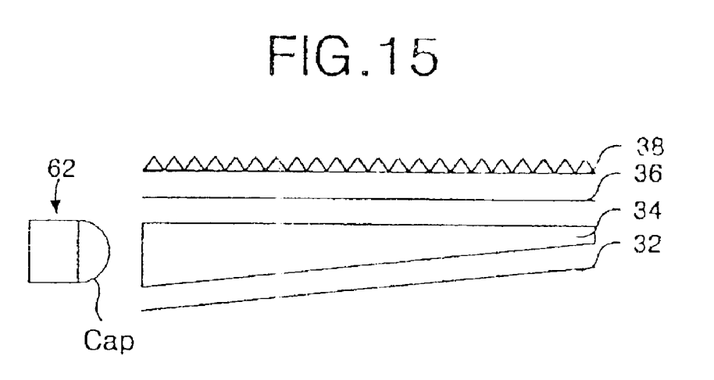
FIG. 15 is a view representing a backlight unit according to a fourth embodiment of the present invention.

Referring to FIG. 15, a backlight unit according to a fourth embodiment of the present invention includes a light emitting diode lamp 62 for generating light, a light guide panel 34 for guiding the light generated at the light emitting diode lamp 62, a reflecting plate located under the light guide panel 34 for reflecting a light beam, which progresses to a lower surface and side surfaces of the light guide panel 34 to the upper surface, a diffusion sheet 36 for diffusing the light beam passed through the light guide panel 34, and a prism sheet 38 for controlling the progress direction of the light beam passed through the diffusion sheet 36.

Figure 16:
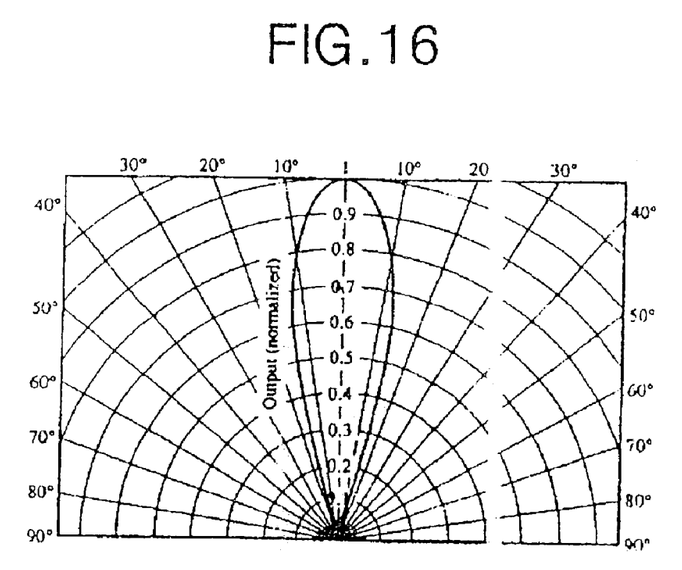
FIG. 16 is a graph representing the characteristic of a light emitting diode shown in FIG. 15.

The light emitting diode LED lamp 62 is used as a light source because it can make a tricolor of R, G, B. The light generated in the LED lamp 62 has a characteristic of being oriented in a special direction so that a radial pattern, as shown in FIG. 16, appears in the LED lamp 62. The radial pattern is determined by the curvature of the cap of the LED lamp 62, and if the radial pattern is narrower, the light is condensed more in a specific direction. It is desirable to control the curvature for the light distribution to be to the extent of 0° to ±30°. Light highly condensed in such a LED lamp 62 is incident on the light guide panel 34 through the incident surface existing at the side surface of the light guide panel 34.

The light guide panel 34 causes the light incident from the LED lamp 62 delivered to an area distant from the lamp 62. The reflecting plate 32 is installed at the lower surface of the light guide panel 34 so as to face it.

The reflecting plate 32 reflects the light incident on itself through the rear surface of the light guide panel 34 to the light guide panel 34, thereby reducing light loss. A printed pattern formed at the lower surface of the light guide panel 34 is provided so that the light beam generated at the LED lamp 62 is reflected at a specific angle at the rear surface, being an inclined surface, to uniformly progress to an out-coming surface. At this moment, the light progressing to the lower surface and the side surface of the light guide panel 34 is reflected at the reflecting plate 32 to progress to the out-coming surface. The light coming out via the light guide panel 34 is diffused to the whole area by the diffusion sheet 36.

On the other hand, the light incident on a liquid crystal display panel (not shown) has the highest light efficiency when perpendicular to the liquid crystal display panel. Therefore, a prism sheet 38 is formed to make the progress angle of the light, which has come out of the light guide panel 34, to be perpendicular to the liquid crystal display panel. The light passed through the prism sheet 38 is incident on the liquid crystal display panel.

Thus, the backlight unit according to the fourth embodiment of the present invention uses the LED lamp 62 to highly condense the light, thereby restraining light loss. Also, due to the prism sheet 38 being reduced to one sheet, the cost is reduced.

Figure 17:
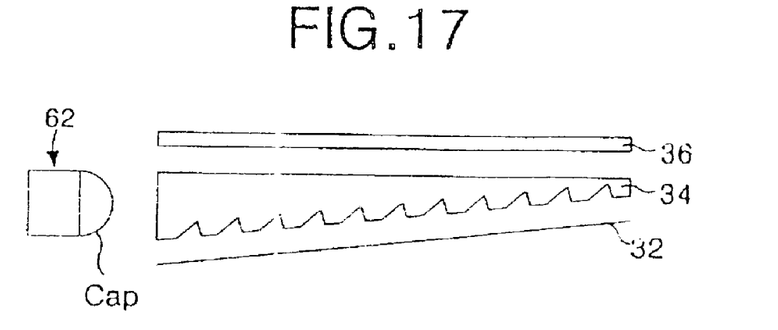
FIG. 17 is a view representing a backlight unit according to a fifth embodiment of the present invention.

FIG. 17 is a view representing a backlight unit according to a fifth embodiment of the present invention.

Referring to FIG. 17, the backlight unit according to a fifth embodiment of the present invention includes the same components except that an LED lamp 62 is formed instead of the lamp of the light incident part as compared with the backlight unit shown in FIG. 5.

The LED lamp 62 has a characteristic of condensing light in a specific direction. Accordingly, the curvature of the cap of the LED lamp 62 is controlled for light distribution to be to the extent of ±30°. The light highly condensed at the LED lamp 62 is incident to the light guide panel 34 through an incident surface existing at the side surface of the light guide panel 34.

A reflecting plate 32 is installed at the rear surface of the light guide panel 34 so as to face it. The reflecting plate 32 reflects the light incident on itself through the rear surface of the light guide panel 34 to the light guide panel 34, thereby reducing light loss.

The light guide panel 34 makes the light incident from the LED lamp 62 delivered to an area distant from the lamp 62.

The lower surface of the light guide panel 34 is formed to be inclined at a specific angle as stated above in FIGS. 6 and 7, and a plurality of engraved patterns A are formed. The engraved patterns A are formed in the shape of a triangle, that is, the lower surface 60 of the light guide panel 34 is etched as much as a specific depth 'h' of a few μm up to dozens of μm in accordance with the size of the liquid crystal display panel, to have the first inclined plane L1 and the second inclined plane L2.

The angle α between the lower surface 60 of the light guide panel 34 and the first inclined plane L1 is set to be in a range of 25~60°, the angle β between the lower surface 60 of the light guide panel 34 and the second inclined plane L2 is set to be in a range of 60~90° so that the vertical angle of the engraved pattern facing the out-coming surface of the light guide panel 34 is set to be 30~95°. It is desirable to have the angle α between the lower surface 60 of the light guide panel 34 and the first inclined plane L1 is set to be in a range of 46~50°, the angle β between the lower surface 60 of the light guide panel 34 and the second incline plane L2 is set to be in a range of 78~82°.

In order to secure the uniformity of the light beam, it is desirable that the gap y between the engraved patterns A is set wider if it is closer to the light incident part 50, and that the gap y between the engraved patterns A is set more narrow if it is more distant from the light incident part 50.

Because the obscure ray generated near the light incident part 50 is eliminated more if the starting point S of the engraved pattern formed at the light guide panel 34 is closer to the end toward the light incident part, the engraved pattern A should start within a few mm from the end of the light guide panel 34 toward the light incident part.

The pitch P of the engraved pattern located in between the area adjacent to the incident surface of the light guide panel 34 and the mid area is formed relatively larger, and the pitch P of the engraved pattern located in the other area is formed relatively smaller.

In this way, the backlight unit according to a fifth embodiment of the present invention uses the LED lamp 62 to highly condense light, thereby reducing costs.

Figure 18:
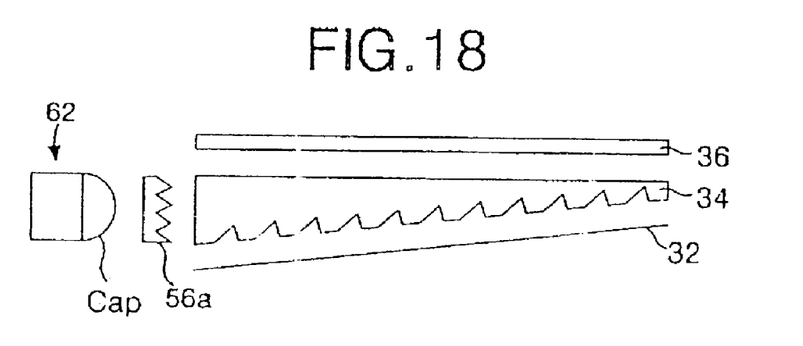
FIG. 18 is a view representing a backlight unit according to a sixth embodiment of the present invention.

FIG. 18 is a view representing a backlight unit according to a sixth embodiment of the present invention.

Referring to FIG. 18, the backlight unit according to a sixth embodiment of the present invention includes the same components except that an LED lamp 62 is formed instead of the lamp 52 of the light incident part 50 as compared with the backlight unit shown in FIG. 9.

Because the LED lamp 62 has a characteristic of condensing light in a specific direction, the backlight unit according to a sixth embodiment of the present invention controls the curvature of the cap of the LED lamp 62 for light distribution to be to the extent of ±30°. The light highly condensed at such an LED lamp 62 is incident on a condenser 56a.

The condenser 56a is formed of a plurality of prism patterns to condense the light. Also, the condenser 56a is formed between the LED lamp 62 and the light guide panel 34 to reduce light loss caused by the opening between the LED lamp 62 and the light guide panel 34. That is, the condenser 56a condenses the light generated at the LED lamp 62. In this way, the light condensed by the condenser 56a is incident on the light guide panel 34 through the incident surface existing at the side surface of the light guide panel 34.

The first and second in-between angle $\gamma 1$ and $\gamma 2$ of the condenser 56a are formed to be in a range of 10~45°, as shown in FIG. 10. To be desirable, when the first and second in-between angle $\gamma 1$ and $\gamma 2$ are in a range of 35~37°, the light is condensed at its maximum. The condenser 56a is formed of acrylic resin etc., which has its strength high so as not to be easily deformed or broken and to have good transmittance. For example, the condenser 56a is formed of Polymethyl Methacrylate PMMA.

In this way, the backlight unit according to the sixth embodiment of the present invention uses the LED lamp 62 and the condenser 56a to have the light highly condensed, thereby restraining light loss. Also, the cost can be reduced because it is possible to get rid of prism sheet 38.

Figure 19:
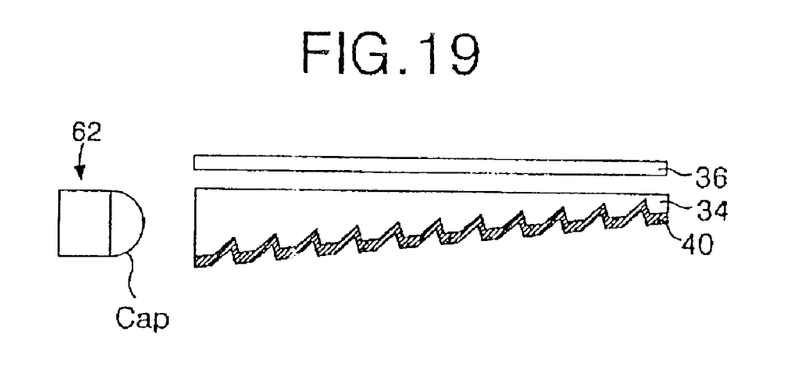
FIG. 19 is a view representing a backlight unit according to a seventh embodiment of the present invention.

FIG. 19 is a view representing a backlight unit according to a seventh embodiment of the present invention.

Referring to FIG. 19, the backlight unit according to a seventh embodiment of the present invention includes the same components except that an LED lamp 62 is formed instead of the lamp 52 of the light incident part 50 as compared with the backlight unit shown in FIG. 12.

Because the LED lamp 62 has a characteristic of condensing light in a specific direction, the backlight unit according to a seventh embodiment of the present invention controls the curvature of the cap of the LED lamp 62 for light distribution to be to the extent of ±30°. The light highly condensed at such an LED lamp 62 is incident on a light guide panel.

The reflecting part 40 formed at the rear surface of the light guide panel 34 reflects the light incident on itself through the rear surface of the light guide panel 34 to the light guide panel 34, thereby reducing light loss.

The reflecting part 40 is coated with reflecting metal at the lower surface of the light guide panel 34 where a plurality of engraved patterns are formed. The reflecting part 40 is formed of a reflecting metal such as silver Ag, aluminum Al etc. The backlight unit with such a reflecting part 40 is applicable to a liquid crystal display of 6 inches or less.

A diffusion sheet 36 diffusing the light beam via the light guide panel 34 is formed at the upper part of the light guide panel 34.

In this way, the backlight unit according to a seventh embodiment of the present invention uses the LED lamp 62 and the reflecting part to have the light highly condensed, thereby restraining light loss. Also, the cost can be reduced because it is possible to obtain condensed light distribution without using a prism sheet.

The backlight unit in accordance with first to seventh embodiments of the present invention can be applicable to a display using a cholesteric liquid crystal CLC color filter, thereby obtaining a condensing effect. That is, in a transmission type liquid crystal display using a CLC color filter in order to obtain a high degree of color purity and high brightness as in the related art, it is possible to solve a color shift problem in accordance with a viewing angle by using the backlight unit in accordance with first to seventh embodiments of the present invention.

The light guide panel of the backlight unit in accordance with first to seventh embodiments of the present invention is formed in a wedge type that the incident surface has its length different from the side surface facing the incident surface. The wedge type is lighter in weight than a flat type, in that the incident surface has its length the same as the side surface, and other parts of the liquid crystal display can be mounted on the inclined area, so it is possible to reduce the bulk of an overall liquid crystal display.

As described above, the backlight unit according to the present invention has a plurality of engraved patterns formed at the lower surface of the light guide panel. The engraved pattern is controlled in its gap and depth etc., so it is possible to control the direction of the light. Accordingly, the backlight unit according to the present invention can be applicable to display panels of various sizes and improve a picture at the same time. Also, in the backlight unit according to the present invention, it is possible to get rid of at least one of either a prism sheet, a diffusion sheet and a reflecting sheet, thereby reducing costs. Moreover, the backlight unit according to the present invention can obtain a highly condensed light by using a light emitting diode that controls the curvature to condense the out-coming light within a specific angle.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A backlight unit, comprising:
   a light source for generating light;
   a lamp housing installed to cover the light source and for reflecting the light; and
   a light guide panel comprising a plurality of engraved patterns with a specific gap between the patterns and a specific depth of the patterns with respect to a lower surface of the panel, and
   wherein the vertical angle of the engraved patterns, which faces a light emission surface of the light guide panel, is in a range of from an angle greater than 55° up to and including 95°; and
   wherein the engraved patterns are formed in the shape of a polygon, and the pitch has a first tilt angle and a second tilt angle that differs from the first tilt angle.

2. The backlight unit according to claim 1, further comprising:
   a diffusion sheet for diffusing a light beam passed through the light guide panel; and
   a prism sheet for controlling the progress direction of the light beam passed through the diffusion sheet.

3. The backlight unit according to claim 1, wherein the specific gap is formed relatively wider if the engraved pattern is closer to the light source, and relatively narrower if the engraved pattern is more distant from the light source.

4. The backlight unit according to claim 1, wherein the specific depth is formed by etching a lower surface of the light guide panel from a few μm up to dozens of μm in accordance with the size of a display panel.

5. The backlight unit according to claim 1, wherein the engraved pattern is formed with a distance of a few mm from an incident surface of the light guide panel.

6. The backlight unit according to claim 1, wherein a pitch of the engraved pattern is formed smaller if the pitch is located at a side surface area facing an incident surface of the light guide panel, and larger if the pitch is located at another area of the light guide panel.

7. The backlight unit according to claim 1, wherein at least one condenser having a prism pattern is formed between the light source and an incident surface of the light guide panel for condensing light.

8. The backlight unit according to claim 7, wherein the condenser is formed of Polymethyl Methacrylate PMMA.

9. The backlight unit according to claim 7, wherein the condenser has a first tilt angle and a second tilt angle formed on a lower surface of the condenser, and the first and second tilt angles are in a range of about 10~45°.

10. The backlight unit according to claim 1, further comprising;
    a reflecting plate formed facing the light guide panel at a lower part of the light guide panel.

11. The backlight unit according to claim 1, further comprising;
    a reflecting part coated with reflecting metal to be formed on the engraved pattern at a lower surface of the light guide panel.

12. The backlight unit according to claim 11 wherein the reflecting metal is formed of aluminum Al or silver Ag.

13. The backlight unit according to claim 12, wherein the backlight unit is utilized in a display panel of 6 inches or less.

14. A backlight unit, comprising:
    a light emitting diode lamp for emitting light within a specific angle; and
    a light guide panel whereon there are formed a plurality of engraved patterns with a specific gap and a specific depth at a lower surface thereof, and
    wherein the vertical angle of the engraved pattern, which faces a light emission surface of the light guide panel, is in a range of from an angle greater than 55° up to and including 95°.

15. The backlight unit according to claim 14, wherein the specific gap is formed relatively wider if the engraved pattern is closer to the light emitting diode, and relatively narrower if the engraved pattern is more distant from the light emitting diode.

16. The backlight unit according to claim 14, wherein the specific depth is formed by etching a lower surface of the light guide panel from a few μm up to dozens of μm in accordance with the size of a display panel.

17. The backlight unit according to claim 14, wherein the engraved pattern is formed with a distance of a few mm from an incident surface of the light guide panel.

18. The backlight unit according to claim 14, wherein a pitch of the engraved pattern is formed smaller if the pitch is located at a side surface area facing an incident surface of the light guide panel, and larger if the pitch is located at another area of the light guide panel.

19. The backlight unit according to claim 18, wherein the engraved pattern is formed in the shape of a triangle, and the pitch has a first and second tilt angle formed.

20. The backlight unit according to claim 14, wherein at least one condenser or prism pattern is formed between the light emitting diode and an incident surface of the light guide panel for condensing light.

21. The backlight unit according to claim 14, further comprising;
a reflecting plate formed facing the light guide panel at a lower part of the light guide panel.

22. The backlight unit according to claim 14, further comprising;
a reflecting part coated with reflecting metal to be formed on the engraved pattern at a lower surface of the light guide panel.

23. The backlight unit according to claim 22, wherein the reflecting metal is formed of aluminum Al or silver Ag.

24. The backlight unit according to claim 23, wherein the backlight unit is utilized in a display panel of 6 inches or less.

* * * * *